United States Patent
Plachtyna et al.

(10) Patent No.: US 9,541,367 B2
(45) Date of Patent: Jan. 10, 2017

(54) TISSUE CALIPER

(71) Applicant: Covidien LP, Mansfield, MA (US)

(72) Inventors: Steven Plachtyna, North Haven, CT (US); John Pantazis, Stratford, CT (US)

(73) Assignee: Covidien LP, Mansfield, MA (US)

( * ) Notice: Subject to any disclaimer, the term of this patent is extended or adjusted under 35 U.S.C. 154(b) by 261 days.

(21) Appl. No.: 14/247,281

(22) Filed: Apr. 8, 2014

(65) Prior Publication Data

US 2014/0325859 A1 Nov. 6, 2014

Related U.S. Application Data

(60) Provisional application No. 61/818,092, filed on May 1, 2013.

(51) Int. Cl.
*G01B 3/20* (2006.01)
*G01B 5/06* (2006.01)

(52) U.S. Cl.
CPC .............. *G01B 3/205* (2013.01); *G01B 5/06* (2013.01)

(58) Field of Classification Search
CPC .............. G01B 5/06; G01B 7/06; G01B 3/205
USPC ..................................................... 33/512, 783
See application file for complete search history.

(56) References Cited

U.S. PATENT DOCUMENTS

| | | | |
|---|---|---|---|
| 2,467,263 A * | 4/1949 | Krisanda ................ | G01B 3/20 33/810 |
| 2,542,030 A | 2/1951 | Hoppe | |
| 2,625,585 A | 1/1953 | Krouse | |
| 2,903,645 A | 9/1959 | Wright et al. | |
| 3,166,850 A * | 1/1965 | Yamazawa .............. | G01B 3/18 33/828 |
| 3,962,792 A * | 6/1976 | Stepanek ................ | G01B 7/12 33/501.04 |
| 4,008,523 A * | 2/1977 | von Voros ............. | G01B 3/205 33/784 |
| 4,070,760 A | 1/1978 | Roth et al. | |
| 4,233,743 A * | 11/1980 | Flick ..................... | A61B 5/0053 33/512 |
| 4,238,885 A * | 12/1980 | Lendi ..................... | G01B 3/205 33/784 |
| 4,315,372 A * | 2/1982 | Kinkead ............... | A61B 5/0053 33/798 |
| 4,553,337 A * | 11/1985 | Brewster ................. | G01B 3/38 33/199 R |
| 4,567,436 A | 1/1986 | Koch | |
| 4,570,349 A * | 2/1986 | Finkelman ............... | G01B 7/02 33/501 |
| 4,608,759 A * | 9/1986 | Bowhay .................. | G01B 3/20 33/796 |
| 4,733,178 A | 3/1988 | Koch | |
| 4,821,422 A | 4/1989 | Porter | |
| 5,006,799 A | 4/1991 | Pfanstiehl | |
| 5,029,402 A * | 7/1991 | Lazecki ................. | G01B 3/205 33/784 |
| 6,687,646 B2 * | 2/2004 | Mewissen ............. | G01B 3/205 702/161 |

(Continued)

*Primary Examiner* — Christopher Fulton

(57) ABSTRACT

A tissue caliper is provided. The tissue caliper includes a housing assembly including a tubular body, an activation assembly operably received within the housing assembly, and a caliper assembly operably connected to the activation assembly. The activation assembly includes a magnetic spring for effecting the opening and closing of the caliper assembly. Also provided is a kit for measuring tissue thickness.

19 Claims, 15 Drawing Sheets

(56) References Cited

U.S. PATENT DOCUMENTS

| | | | |
|---|---|---|---|
| 6,782,635 B1 * | 8/2004 | Cappiello, Sr. | G01B 3/24 33/783 |
| 6,829,839 B2 * | 12/2004 | Killough | G01B 3/205 33/511 |
| 6,977,498 B2 | 12/2005 | Scherzinger et al. | |
| 7,735,237 B1 * | 6/2010 | Moon | G01B 3/20 33/783 |
| 8,739,428 B2 * | 6/2014 | Emtman | G01B 3/18 33/815 |
| 8,844,153 B2 * | 9/2014 | Hayashida | G01B 3/18 33/819 |
| 8,881,417 B2 * | 11/2014 | Sano | A61B 5/107 33/512 |
| 9,027,255 B2 * | 5/2015 | Tsuji | G01B 3/18 33/813 |
| 2006/0056993 A1 | 3/2006 | Gombinsky et al. | |

* cited by examiner

TISSUE CALIPER

CROSS-REFERENCE TO RELATED APPLICATIONS

This application claims the benefit of and priority to U.S. Provisional Patent Application No. 61/818,092, filed May 1, 2013, the entire disclosure of which is incorporated by reference herein.

BACKGROUND

Technical Field

The present disclosure relates to calipers for measuring tissue thickness. More particularly the present application relates to an improved tissue caliper.

Background of Related Art

Calipers for measuring the thickness of tissue and other anatomical objects are known. Such calipers utilize a conventional spring to, depending on the configuration of the caliper, drive the caliper jaws open or closed. The force provided by conventional springs varies linearly based on the length that the spring is extended or compressed. The more a spring is extended or compressed, the stronger the force exerted by the spring. This characteristic creates inconsistencies when measuring tissue samples of different thickness. For example, using a standard spring, a tissue caliper will exert a much greater force on a 1-inch-thick sample than on a 0.10-inch-thick sample.

The hydraulic nature of tissue further complicates measuring the thickness of tissue. Due to the viscoelastic properties of tissue, users clamping down on tissue for varied periods of time will record completely different measurements.

Therefore, it would be beneficial to have an improved caliper for measuring tissue designed to reduce variability in data collection. It would further be beneficial if such improved caliper was more ergonomic than current designs.

SUMMARY

Accordingly, an improved tissue caliper is provided. The tissue caliper includes a housing assembly including a tubular body, an activation assembly operably received within the housing assembly, and a caliper assembly operably connected to the activation assembly. The activation assembly includes a magnetic spring for effecting the opening and closing of the caliper assembly. The caliper assembly may include a base member and a sliding member. Each of the base member and the sliding member may include a jaw portion for engaging tissue. The magnetic spring may be operably connected to the sliding member.

In one embodiment, the tissue caliper further includes a display assembly for displaying a measurement of thickness of a material operably engaged by the caliper assembly. The tissue caliper may further include a switch assembly for locking the measurement displayed by the display assembly. The switch assembly may include a switch and an RC control circuit. The RC control circuit may be configured to lock the displayed measurement a predetermined time after the release of the switch. The predetermined time may be between two (2) seconds and five (5) seconds. In some embodiments, the predetermined time is three (3) seconds.

The activation assembly may include an end cap for operably engagement by a user. Depression of the end cap relative to the tubular body may cause opening of the caliper assembly. The tissue caliper may further include a removable cover for protecting internal circuitry. In addition, the tissue caliper may include a measuring and display assembly configured to store multiple measurements. The measuring and display assembly may also include a recall feature for reviewing previous measurements. The measuring and display assembly may also be configured to process multiple measurements and provide an average measurement.

Also provided is a kit for measuring tissue. The kit including a tissue caliper including a magnetic spring for effecting an opening and a closing of a caliper assembly, a first set of jaw attachments having a first tissue contact surface defining a first surface area, and at least a second set of jaw attachments having a second tissue contacting surface defining a second different surface area.

BRIEF DESCRIPTION OF THE DRAWINGS

The accompanying drawings, which are incorporated in and constitute a part of this specification, illustrate embodiments of the disclosure and, together with a general description of the disclosure given above, and the detailed description of the embodiment(s) given below, serve to explain the principles of the disclosure, wherein.

DETAILED DESCRIPTION

Figure 1:
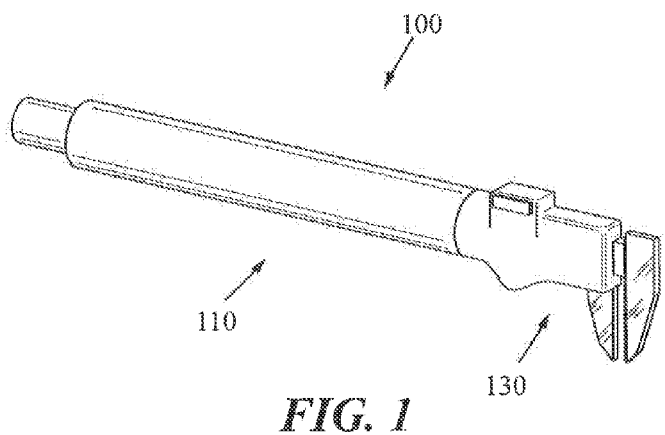
FIG. 1 is a perspective view of an embodiment of a tissue caliper according to the present disclosure.

Embodiments of the presently disclosed tissue caliper will now be described in detail with reference to the drawings in which like reference numerals designate identical or corresponding elements in each of the several views. As is common in the art, the term "proximal" refers to that part or component closer to the user or operator while the term "distal" refers to that part or component further away from the user.

Figure 2:
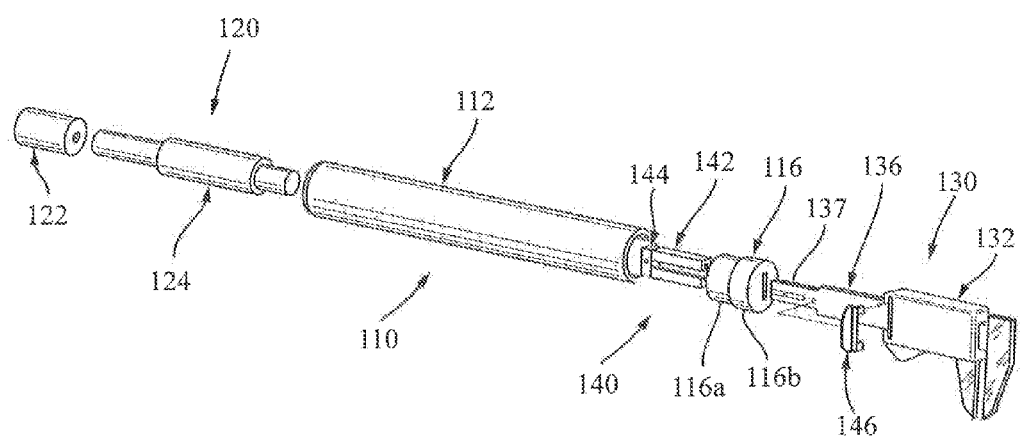
FIG. 2 is an exploded perspective view of the tissue caliper shown in FIG. 1.

With reference to FIGS. 1-18 an embodiment of a tissue caliper according to the present disclosure is shown generally as tissue caliper 100. Referring initially to FIGS. 1 and 2, tissue caliper 100 includes a housing assembly 110, an activation assembly 120, a caliper assembly 130, and a connection assembly 140. As will become apparent from the below disclosure, tissue caliper 100 includes an ergonomic design capable of use by right-handed and left-handed users.

Figure 3:
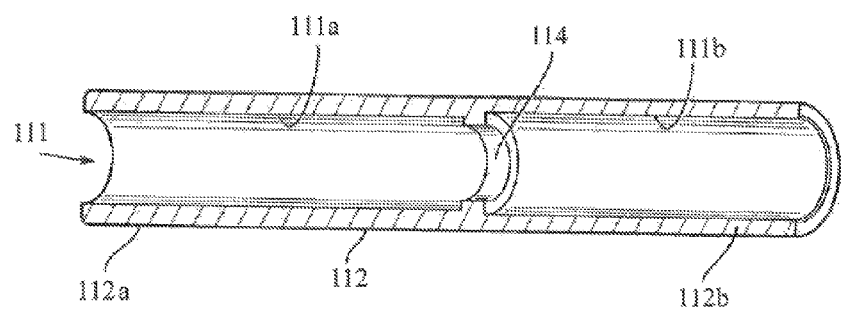
FIG. 3 is a cross-section side view of a tubular body of the tissue caliper shown in FIG. 1.

With reference now to FIGS. 1-4, housing assembly 110 includes a tubular body 112 and a nose cone 116. As seen in FIG. 3, tubular body 112 includes proximal and distal ends 112a, 112b and defines a longitudinal passage 111 extending therethrough. Longitudinal passage 111 is divided by a flange 114 into a first portion 111a and a second portion 111b. First portion 111a of longitudinal passage 111 is configured to operably receive a magnetic spring 124 and second portion 111b is configured to operably receive connection assembly 130. Any or all of first portion 111a of passage 111 may be threaded or include any other features, i.e., tabs, slots, for facilitating attachment of magnetic spring 124 within tubular body 112. Similarly, any or all of second portion 111b may be threaded or include any other features, i.e., tabs, slots, for facilitating attachment of connection assembly 130 within tubular body 112.

Figure 4:
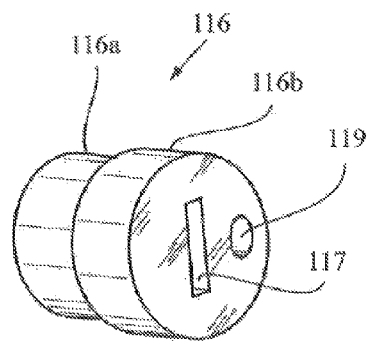
FIG. 4 is a perspective view of a nose cone of the tissue caliper shown in FIG. 1.

With reference now to FIG. 4, nose cone 116 includes a substantially cylindrical body having a proximal portion 116a and a distal portion 116b. Proximal portion 116a is configured to be received within and secured to distal end 112b of tubular body 112. It is envisioned that nose cone 116 may be selectively secured to tubular body 112 to permit separation of nose cone 116 from tubular body 112 (FIG. 3), thereby permitting replacement of actuation assembly 120 and/or caliper assembly 140. In this manner, it is envisioned that proximal portion 116a of nose cone 116 may include external threads configured for engagement with an internally threaded (not shown) distal end 112b of tubular body 112. Alternatively, nose cone 116 may be secured to tubular body 112 by bayonet coupling, mechanical fasteners or any other suitable releasable connection. In an alternative embodiment, nose cone 116 is fixedly secured to tubular body 112 using adhesive, by welding, crimping or other permanent fixation means. Proximal portion 116a acts as a stop to limit the opening of caliper assembly 140. Nose cone 116 defines a rectangular slot 117 extending through proximal and distal portions 116a, 116b for receiving a sliding member 136 of caliper assembly 130. A threaded opening 119 is formed in distal portion 116b of nose cone 116 and is configured to receive a bolt (not shown) for securing anchor 146 of connection assembly 140 to nose cone 116.

Figure 5:
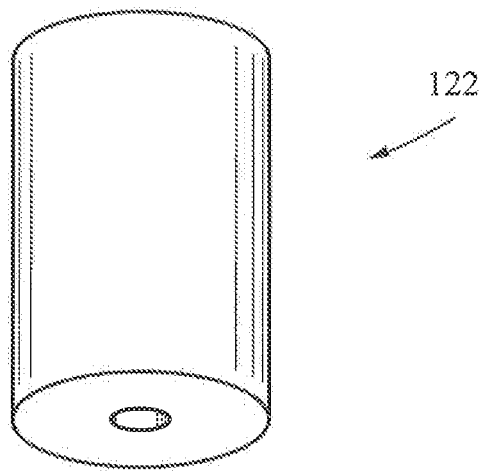
FIG. 5 is a perspective view of a end cap of the tissue caliper shown in FIG. 1.
Figure 6:
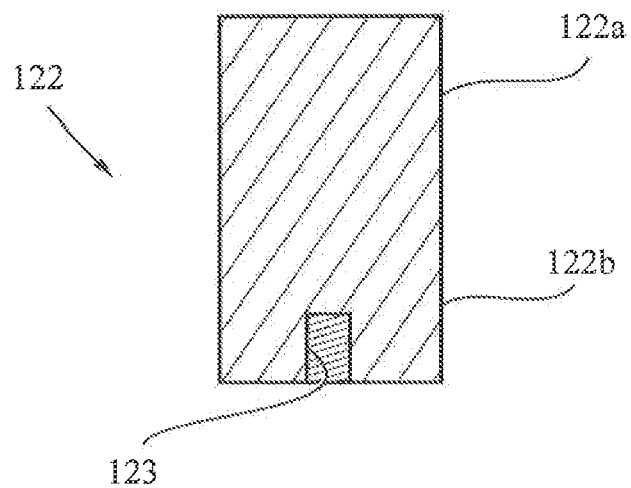
FIG. 6 is a cross-section side view of the end cap shown in FIG. 5.
Figure 7:
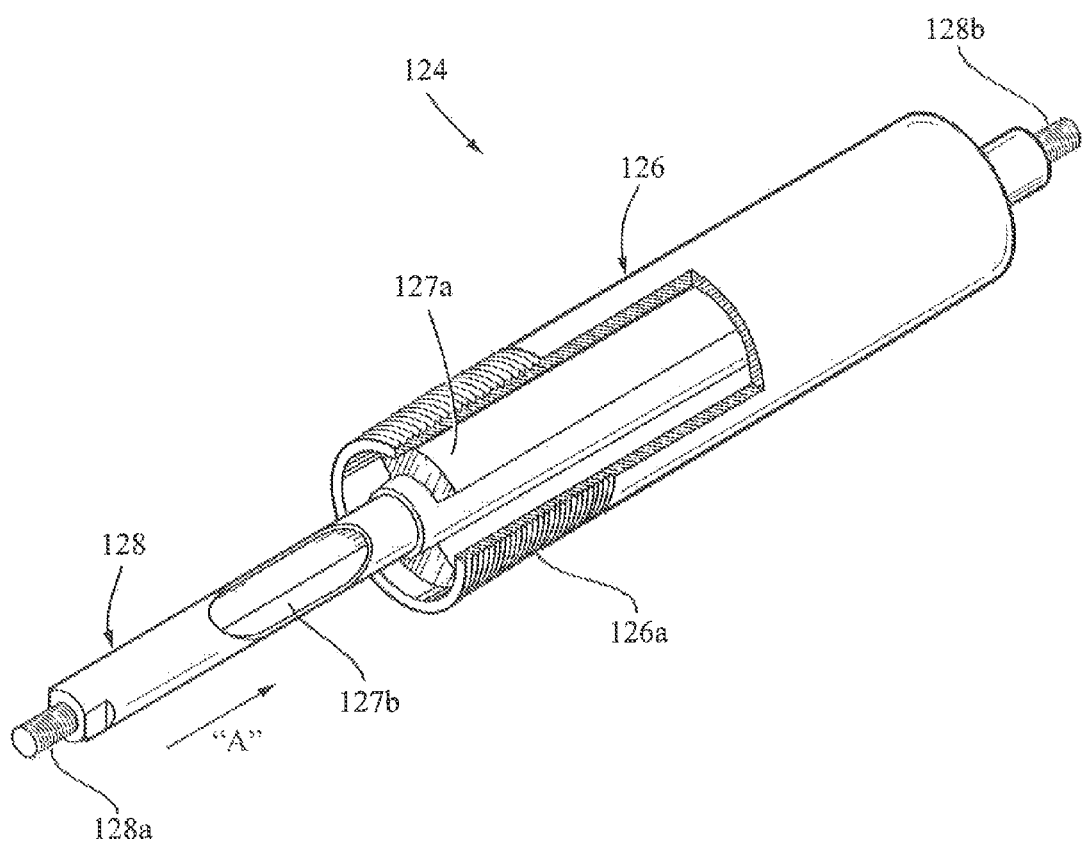
FIG. 7 is a perspective view of a magnetic spring of the tissue caliper shown in FIG. 1.

With reference now to FIGS. 5-7, activation assembly 120 (FIG. 2) includes an end cap 122 (FIGS. 5 and 6) and magnetic spring 124 (FIG. 7). With particular reference to FIGS. 5 and 6, end cap 122 includes a substantially cylindrically body having a proximal end 122a and a distal end 122b. Distal end 122b of end cap 122 includes a threaded opening 123a configured for operable engagement with magnet spring 124. As will be discussed in further detail below, in one embodiment, proximal end 122a of end cap 122 defines a cylindrical recess (not shown) for receiving an activation switch 252 (FIG. 22) of a switch assembly 250.

With reference now to FIG. 7, the spring force necessary to close jaw assembly 140 (FIG. 2) is provided by magnetic spring 124. Magnetic spring 124 includes a stator 126 and a slider 128. Stator 126 includes a substantially tubular body configured to receive slider 128. An outer surface of stator 126 may be threaded or otherwise configured to facilitate attachment within tubular body 112 of housing assembly 110. Magnets 127a, 127b in each of stator 126 and slider 128, respectively, operate to generate a constant force over the entire working range of magnetic spring 124. Slider 128 includes threaded proximal and distal ends 128a, 128b. Threaded proximal end 128a of slider 128 is configured for threaded engagement with opening 123 in distal end 122b of end cap 122 (FIG. 6). Threaded distal end 128b of slider 128 is configured for operable connection with opening 145 (FIG. 14) of connection member 144 of connection assembly 140 (FIG. 2).

As shown in FIG. 7, magnetic spring 124 is in a first or relaxed state. In the first or relaxed state a greater length of slider 128 extends proximally from stator 126. As will be discussed in further detail below, slider 128 is configured to be depressed relative to stator 126, in the direction shown by arrow "A." Upon release of slider 128, magnets 127a, 127b within respective stator 126 and slider 128 operate to apply a constant force to slider 128 while returning slider 128 to the first or relaxed state.

Figure 8:
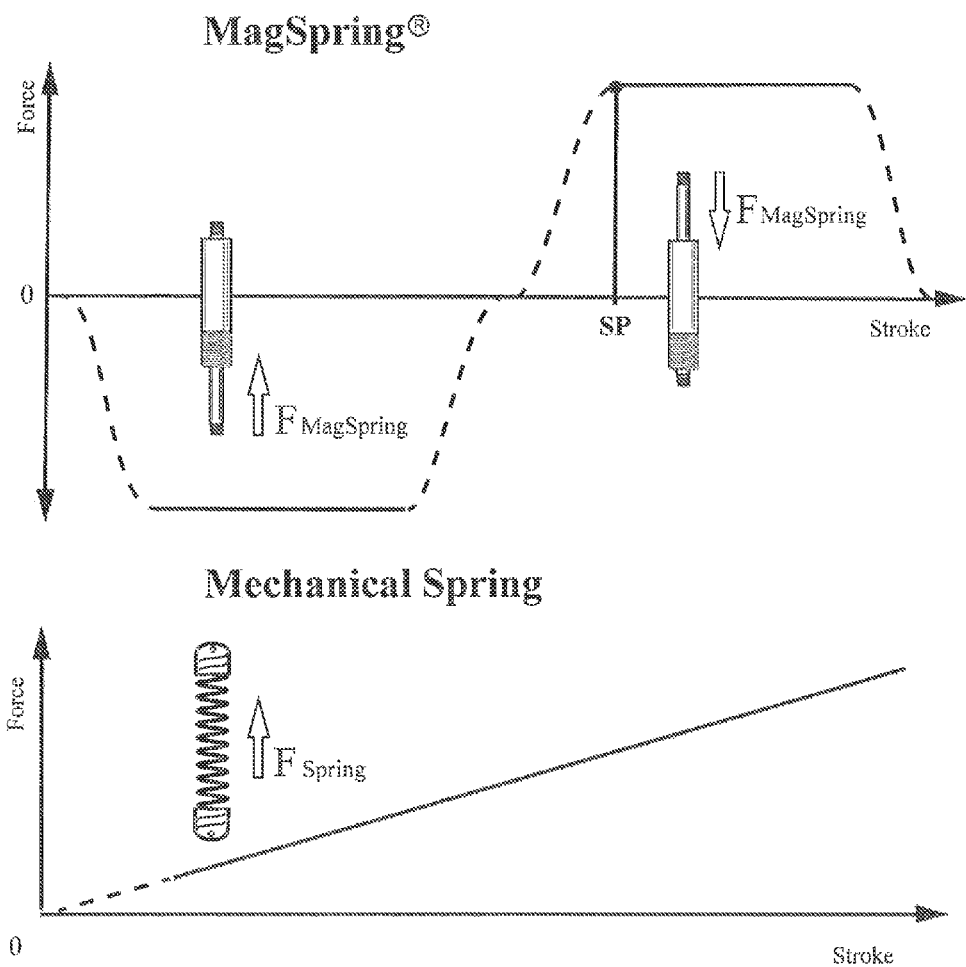
FIG. 8 is set of graphs comparing the force v. the stroke of a magnetic spring and a mechanical spring.

With reference to FIG. 8, unlike a traditional mechanical spring that generates a force that varies linearly based on the length of the stroke (bottom graph), a magnetic spring generates a constant force over the entire working range of the spring (top graph). By providing a constant force throughout the entire working range of the spring tissue caliper 100 provides consistent measurements over a wide range of tissue thicknesses.

Magnetic springs are passive devices requiring no electricity or pneumatic power. Magnetic springs are available as MagSprings® from LinMot.com, Elkhorn, Wis. Although MagSprings® are only currently available with spring force constants of 11N, 17N, and 22N, it is envisioned that a magnetic spring having any spring force constant may be used with tissue caliper 100. As will be discussed in further detail below, to adjust the amount of force applied to the tissue by caliper assembly 130 when using a magnetic springs with a less than optimal spring force constant, jaw attachments 150 (FIG. 17) may be applied to the jaw portions of caliper assembly 130 to change the surface area of tissue contacting portions, thereby increasing or decreasing the force applied to the tissue by caliper assembly 130.

Figure 9:
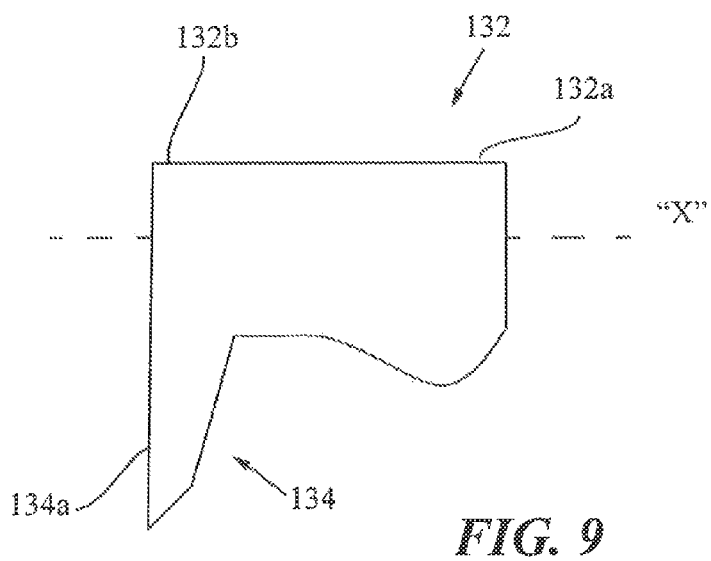
FIG. 9 is a side view of a base member of the tissue caliper shown in FIG. 1.
Figure 10:
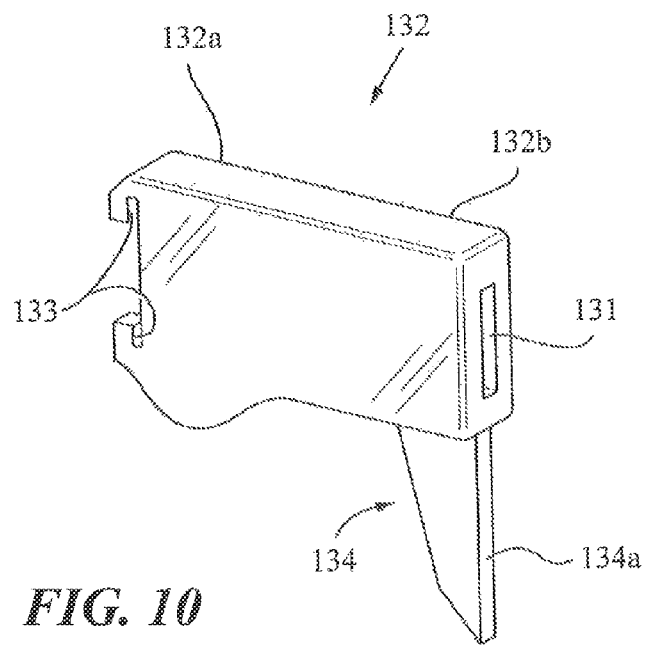
FIG. 10 is a perspective view of the base member shown in FIG. 1.
Figure 11:
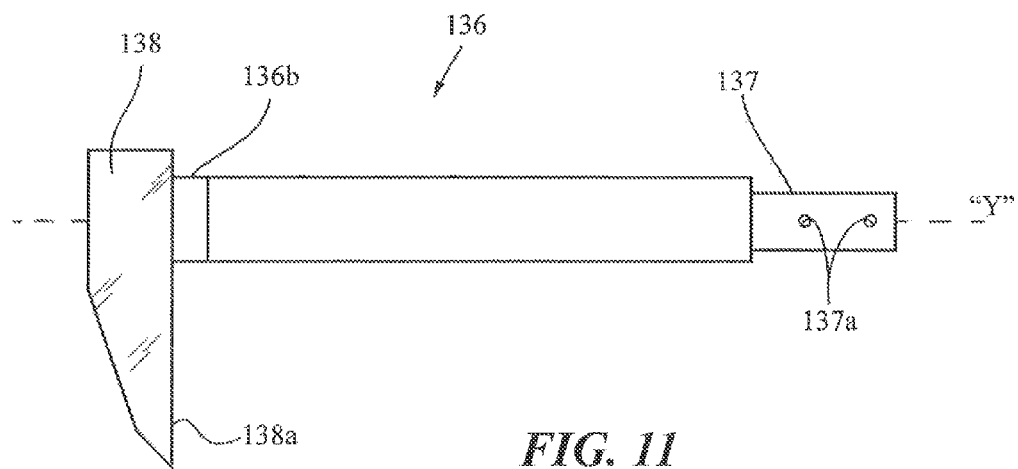
FIG. 11 is a side view of a sliding member of the tissue caliper shown in FIG. 1.
Figure 12:
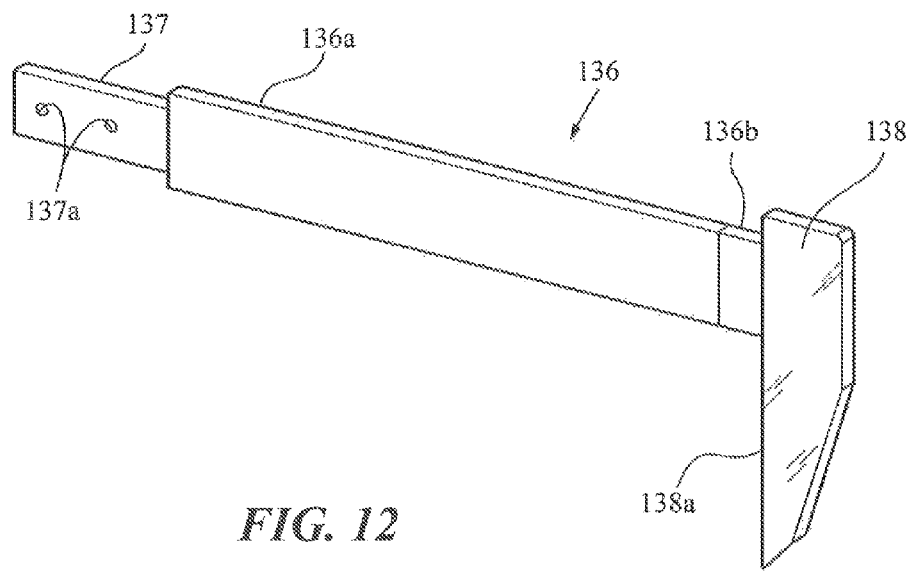
FIG. 12 is a perspective view of the sliding member shown in FIG. 11.
Figure 13:
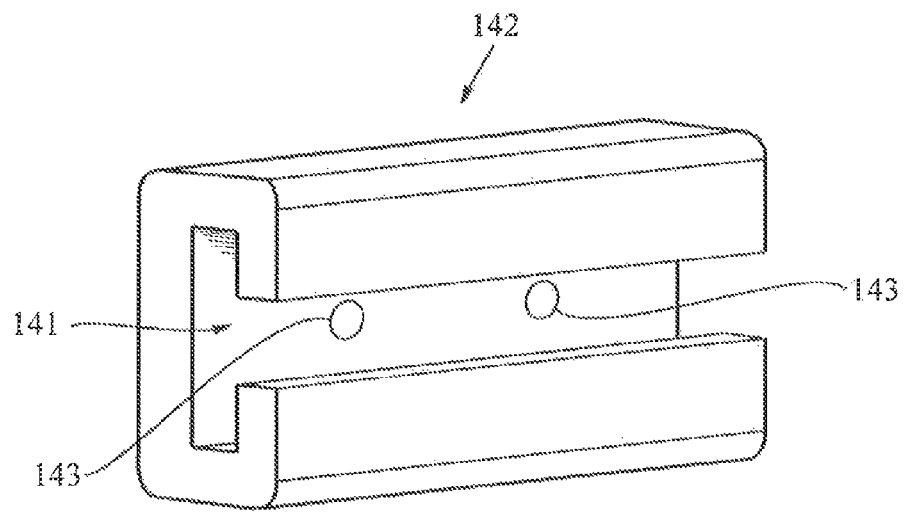
FIG. 13 is a perspective view of a sleeve of the tissue caliper shown in FIG. 1.

With reference now to FIGS. 9-12, caliper assembly 130 (FIG. 2) includes a base member 132 (FIGS. 9 and 10) and a sliding member 136 (FIGS. 11 and 12). With particular reference to FIGS. 9 and 10, base member 132 includes a substantially rectangular body defining a rectangular slot 131 extending between proximal and distal ends 132a, 132b of base member 132. Slot 131 is configured to receive sliding member 136. A jaw portion 134 is formed on distal end 132b of base member 132. A contact surface 134a extends perpendicular to a longitudinal axis "x" defined by rectangular slot 131. A cutout 133 is formed in proximal end 132a of base member 132 and is configured to receive an anchor member 146 of connection assembly 140.

Turning now to FIGS. 11 and 12, sliding member 136 of caliper assembly 130 includes an elongated rectangular body having a rectangular extension 137 formed on a proximal end 136a and a jaw portion 138 formed on a distal end 136b. Sliding member 136 is configured to be received through rectangular slot 131 of base member 132 in a sliding manner. Extension 137 is configured for operable connection with a sleeve 142 of connection assembly 140. Although shown with a pair of openings 137a each configured to receive a bolt (not shown) for connection to sleeve 142 of connection assembly 140, it is envisioned that extension 137 may be fixedly or releasably connected to sleeve 142 using any suitable method. Jaw portion 138 includes a contact surface 138a extending perpendicular to a longitudinal axis "y" defined by sliding member 136.

Although not shown, caliper assembly 130 further includes a mechanism for measuring the distance between jaw portion 134 of base member 132 and jaw portion 138 of sliding member 136 and a mechanism for displaying the distance measurement to a user. It is envisioned that any measuring and/or display mechanisms used with traditional tissue calipers may be incorporated into tissue caliper 100 for measuring and displaying tissue thickness. For example, tissue caliper 130 may include markings or an analog display consisting of a dial that rotates on a scale as sliding member 136 is moved relative to base member 132. Alternatively, tissue caliper 130 may include an electronic display consisting of a LCD screen for displaying the distance between sliding member 136 and base member 132.

Figure 14:
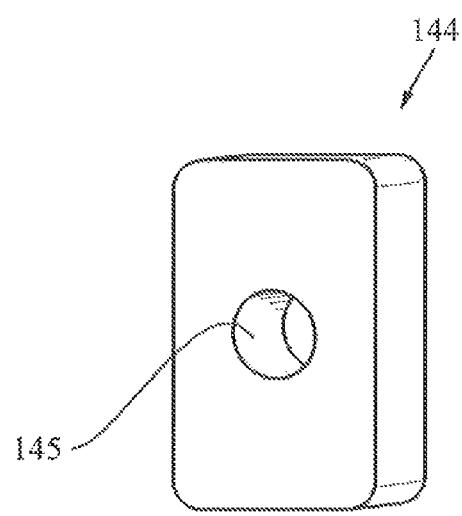
FIG. 14 is a perspective view of a connection member of the tissue caliper shown in FIG. 1.
Figure 15:
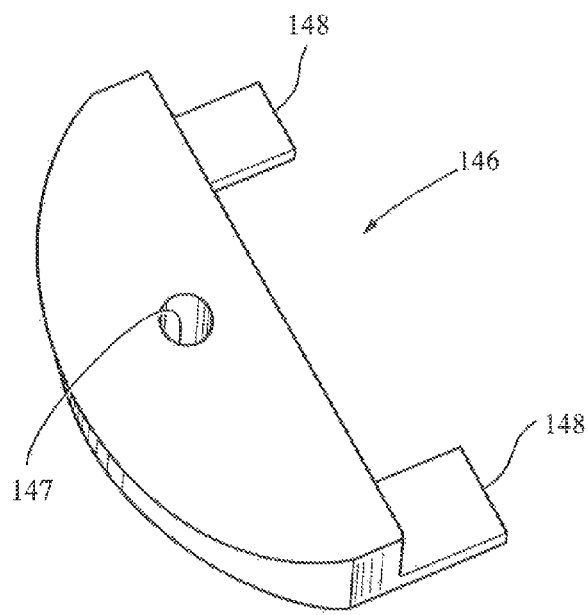
FIG. 15 is a perspective view of an anchor member of the tissue caliper shown in FIG. 1.

With reference now to FIGS. 13-16, connection assembly 140 (FIG. 2) includes sleeve 142 (FIG. 13), connection member 144 (FIG. 14), and anchor member 146 (FIG. 15). With initial reference to FIG. 13, sleeve 142 include an elongated substantially C-shaped body configured to be received within second portion 111b of passage 111 of tubular body 112 (FIG. 2) in a sliding manner. Sleeve 142 defines a rectangular slot 141 configured to receive extension 137 of sliding member 136 of caliper assembly 130. As shown, sleeve 142 includes a pair a threaded openings 143 corresponding to threaded openings 137a in extension 137 of sliding member 136. As discussed above, it is envisioned that extension 137 may be fixedly or releasably secured to sleeve 142 in any suitable manner.

Turning now to FIG. 14, connection member 144 includes a substantially rectangular body configured to be secured to a proximal end 142a (FIG. 13) of sleeve 142. It is envisioned that connection member 144 may be fixedly or releasably secured to sleeve 142 in any suitable manner, including, for example, by welding, with adhesive, or using one or more mechanical fasteners. In an alternative embodiment, sleeve 142 and connection member 144 are of unitary construction. Connection member 144 defines a threaded opening 145 configured to selectively engage threaded distal end 128a of slider 128 of magnetic spring 124.

Figure 16:
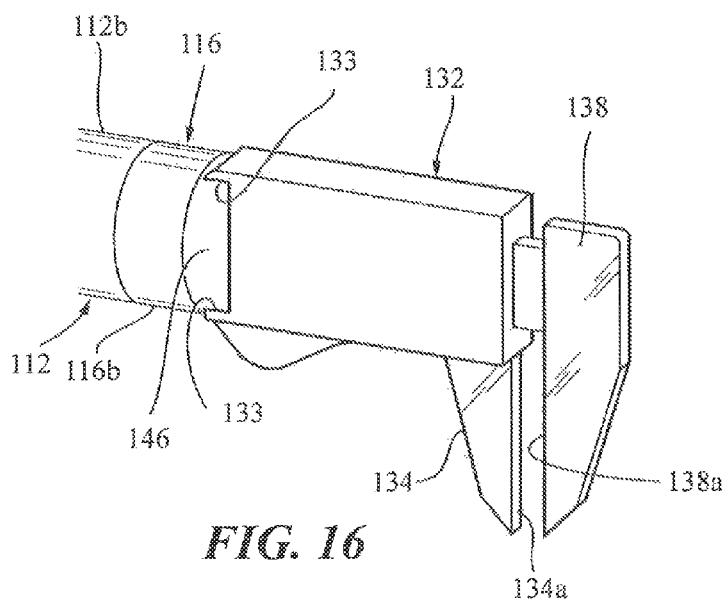
FIG. 16 is a perspective view of the distal end of the tissue caliper shown in FIG. 1.

With reference now to FIGS. 15 and 16, anchor member 146 includes a semi-circular body having a pair of tabs 148 extending outwardly from a flattened portion of the semi-circular body. Tabs 148 are configured to be received within recesses 133 formed in base member 132 of caliper assembly 130. When tissue caliper 100 is assembled, receipt of tabs 148 of anchor member 146 in recesses 133 of base member 132 and attachment of anchor member 146 to nose cone 116 secures caliper assembly 130 to tubular body 112. Anchor member 146 may be fixed or releasably secured to nose cone 116 using any suitable method. In one embodiment, and as shown, nose cone 116 (FIG. 4) defines a threaded opening 119 for selectively receiving a bolt (not shown) received through an opening 147 defined in anchor member 146 to selectively secure base member 132 of caliper assembly 130 to tubular body 112 of housing assembly 110.

Figure 17:
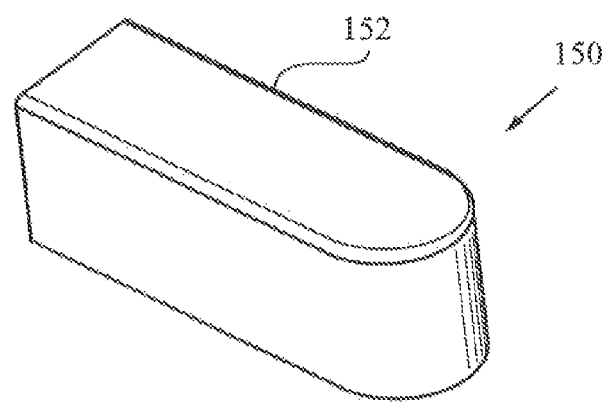
FIG. 17 is a perspective view of a jaw attachment of the tissue caliper shown in FIG. 1.
Figure 18:
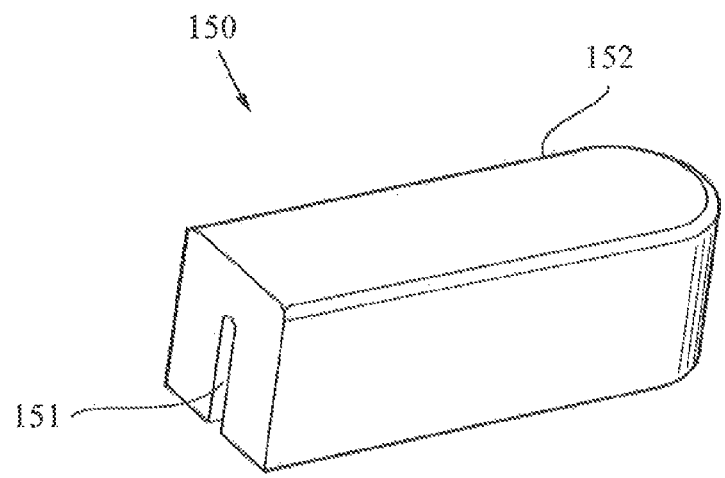
FIG. 18 is another perspective view of the jaw attachment shown in FIG. 17.

With reference now to FIGS. 17 and 18, tissue caliper 100 may optionally include jaw attachments 150. Jaw attachments 150 define a slit 151 and are configured to be received about jaw portions 134, 138 of respective base member 132 (FIG. 9) and sliding member 136 (FIG. 11). As discussed above, by selecting jaw attachments 150 with a given tissue contacting surface area 152, the amount of force applied to a tissue sample may be varied without having to replace magnetic spring 124.

The assembly of tissue caliper 100 will now be described with reference to FIGS. 1-18, and with particular reference to FIG. 2. Initially, the body portion of sliding member 136 of caliper assembly 130 is received through rectangular slot 131 formed in base member 132 of caliper assembly 130 and through rectangular slot 117 formed in nose cone 116. Extension 137 is then received within rectangular slot 141 of sleeve 142 and extension 137 is secured to sleeve 142. As discussed above, extension 137 and sleeve 142 each define a pair of thread openings 137a (FIG. 11), 143 (FIG. 13), respectively, for receiving a threaded bolt for securing sliding member 136 to sleeve 142. As also discussed above, it is envisioned that sliding member 136 and sleeve 142 may be fixedly or releasably secured in any suitable manner. If connection member 144 is not integrally formed with sleeve 142 or has not previously been secured to sleeve 142, connection member 144 is next secured to sleeve 142.

Next nose cone 116 is secured to tubular body 112 and anchor member 146 is secured to nose cone 116 to secure caliper assembly 130 to tubular body 112. As discussed above, proximal portion 116a of nose cone 116 may include external threads configured for threaded engagement distal end 112b of tubular body 112, although other releasable and fixed methods of securing nose cone 116 to tubular body 112 are envisioned. To secure base member 132 of caliper 130 to tubular body 112 of housing assembly 110, tabs 148 of anchor member 146 are received within recesses 133 formed in base member 132 and a threaded bolt (not shown) is received through opening 147 in anchor member 146 and is received within threaded opening 119 formed in nose cone 116.

Once connection assembly 140 is secured to caliper assembly 130, caliper assembly 130 is secured to housing assembly 110, and connection assembly 140 is secured within housing assembly 110, magnetic spring 124 is secured within proximal portion 111a of passage 111 defined by tubular body 112. As discuss above, stator 126 of magnetic spring 124 may be threaded or otherwise configured to facilitate attachment of magnetic spring 124 within tubular body 112. Slider 128 of magnetic spring 124 may then be rotated to secure distal end 128b of slider 128 through use of threads to connection member 144 of connection assembly 140. Once magnetic spring 124 is secured within tubular body 112 and slider 128 is attached to connection assembly 140, end cap 122 may be threaded on proximal end 128 of slider 128.

Once assembled, tissue caliper 100 is ready for use. As noted above, the ergonomic design of tissue caliper 100 makes tissue caliper 100 easy to use. Tissue caliper 100 is configured for single-handed use and may be operated with either the right or left.

Tissue caliper 100 may be provided as a kit with one or more sets of jaw attachments 150 of various sizes for adjusting the forces applied to the tissue by caliper assembly 130. In this manner, the user may adjust tissue caliper 100 for use with tissue have differing physical properties.

With reference now to FIGS. 19-22, a tissue caliper according to another embodiment of the present disclosure is shown generally as tissue caliper 200. Tissue caliper 200 is substantially similar to tissue caliper 100 described above, and will only be described as relates to the differences therebetween.

Figure 19:
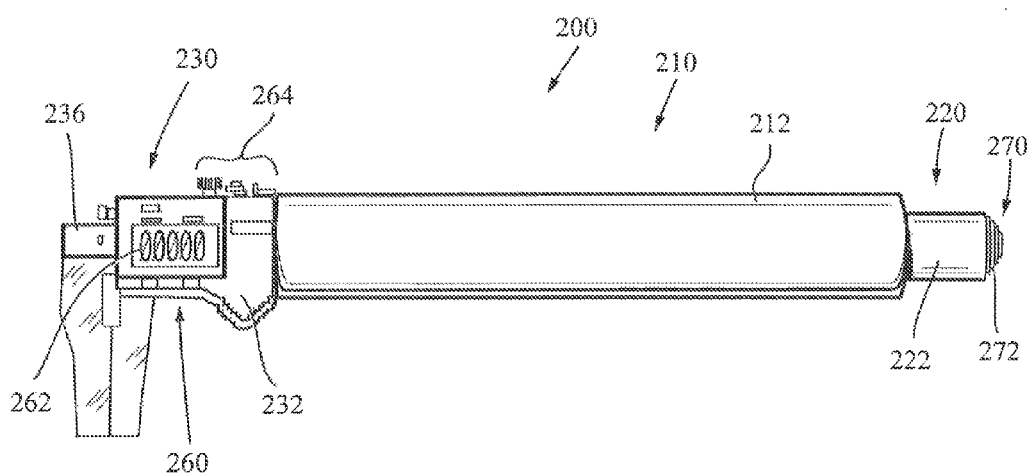
FIG. 19 is a side view of another embodiment of a tissue caliper according to the present disclosure.
Figure 23:
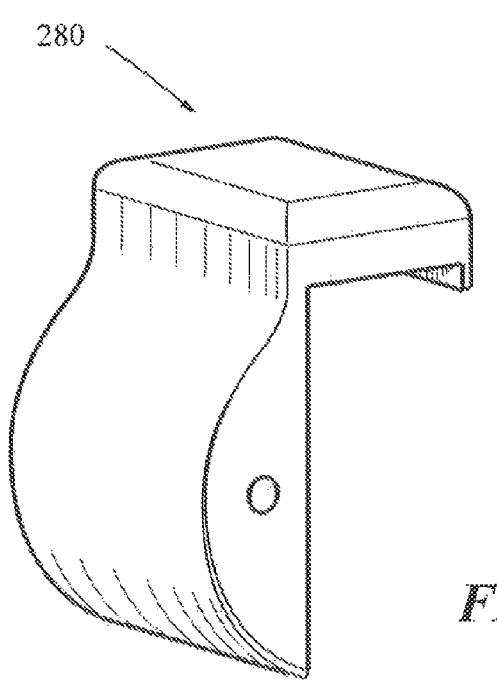
FIG. 23 is perspective view of a protective cover of the tissue caliper shown in FIG. 18.

With reference to FIG. 19, briefly, tissue caliper 200 includes a housing assembly 210 including tubular body 212, an activation assembly 220 including end cap 222, a caliper assembly 230 including a base member 232 and a sliding member 236, and a connection assembly (not shown). Tissue caliper 200 further includes a measuring and display assembly 260, and a switch assembly 270. Tissue caliper 200 may also include a protective cover 280 (FIG. 23).

Figure 20:
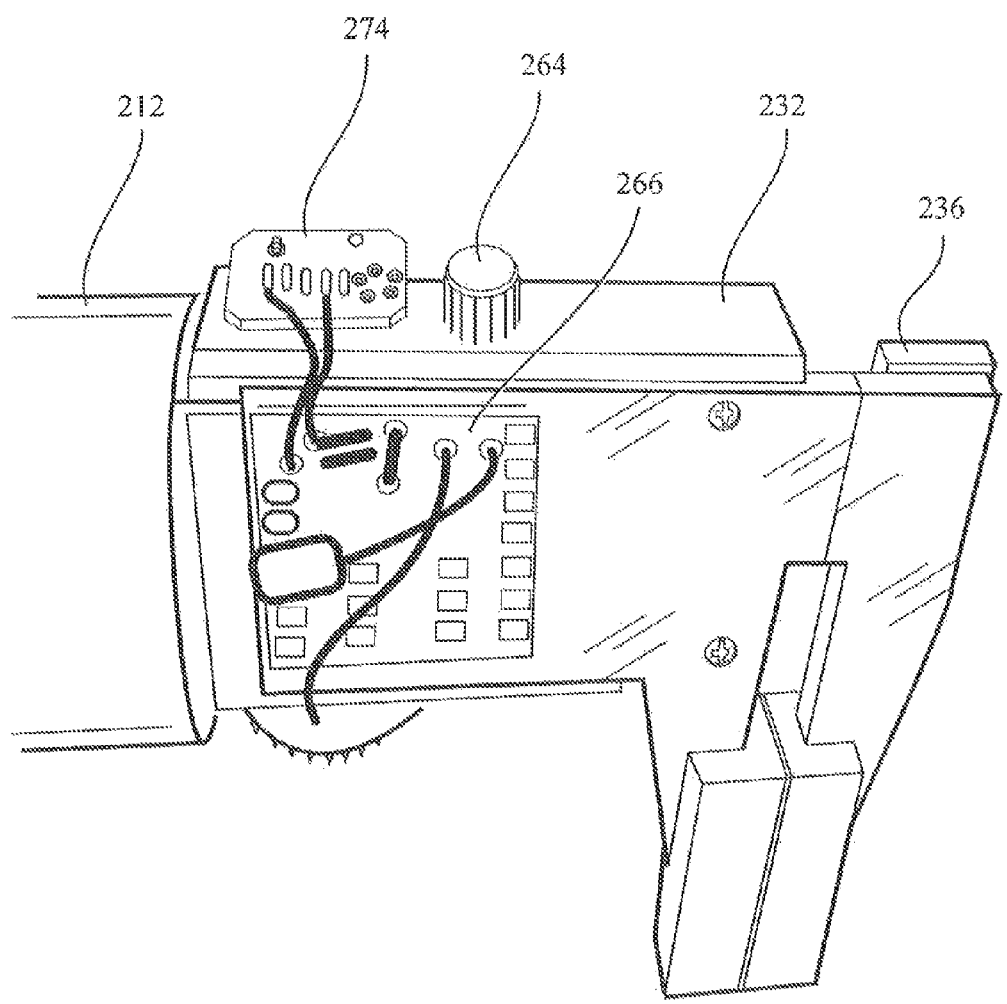
FIG. 20 is a side view of the distal end of the tissue caliper shown in FIG. 19 with a portion of base member removed.

With reference now to FIGS. 19 and 20, measuring and display assembly 260 includes a including a display screen 262, controllers 264, and a control circuit 266. Display screen 260 operates to provide a user with a digital readout of the thickness of tissue received between the jaw portions of base member 232 and sliding member 236 of caliper assembly 230. Controllers 264 are provided to allow calibration of tissue caliper 200. As discussed above, in order to modify the force applied to tissue being measured without replacing the magnet spring (not shown), jaw attachments (FIG. 17) may be received over jaw portions of base member 232 and sliding member 236. The addition of the jaw attachments to base member 232 and sliding member 236 necessitates the recalibration of tissue caliper 200. Measuring and display assembly 260 may further be configured to store multiple measurements and/or include a recall feature for reviewing previous measurements. It is further envisioned that measuring and display assembly 260 may be configured to process multiple measurements, i.e., provide an average. In one embodiment, control circuit 266 is a resistor-capacitor (RC) control circuit.

Figure 21:
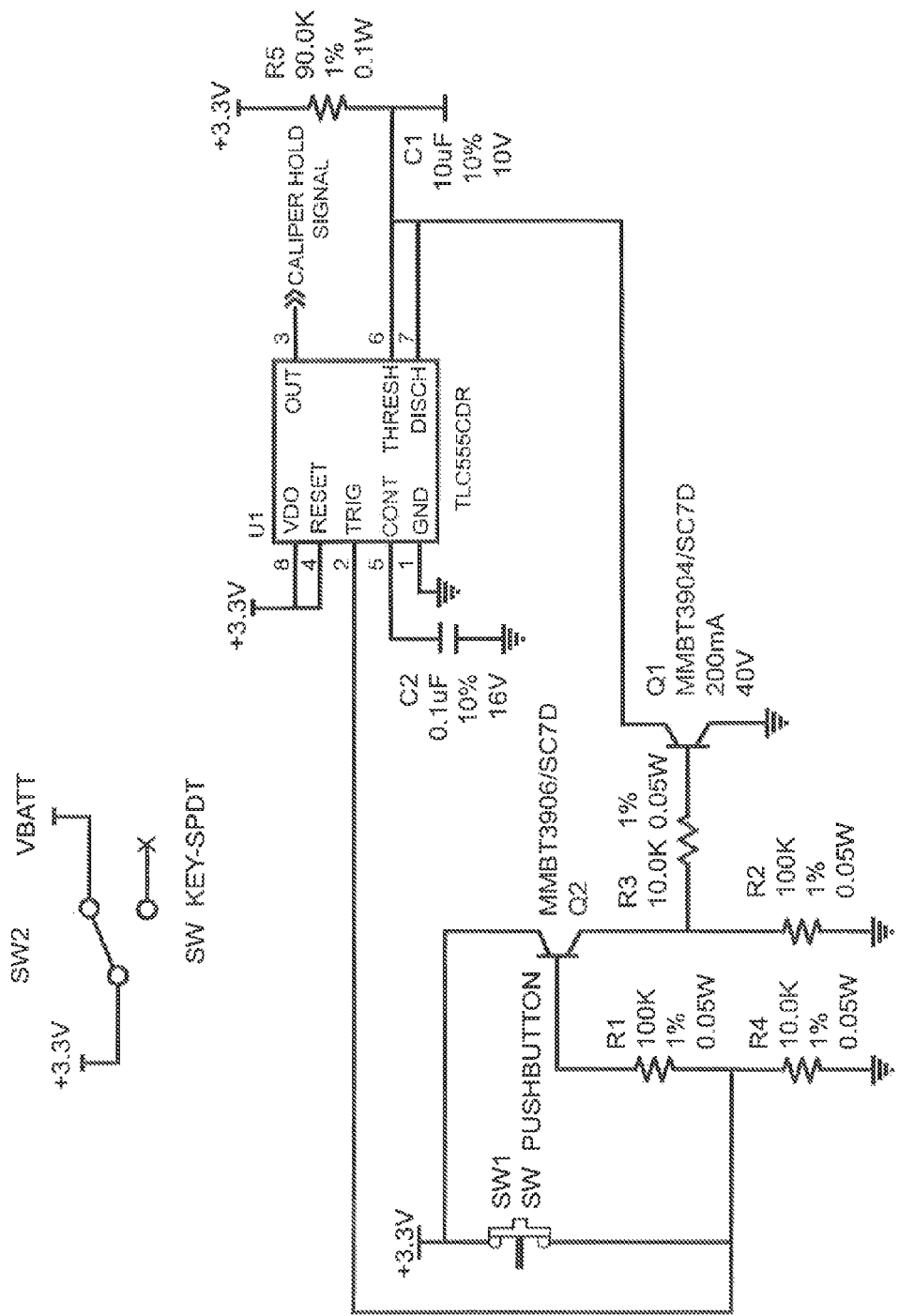
FIG. 21 is a schematic diagram of circuitry for the hold feature of the tissue caliper shown in FIG. 18.
Figure 22:
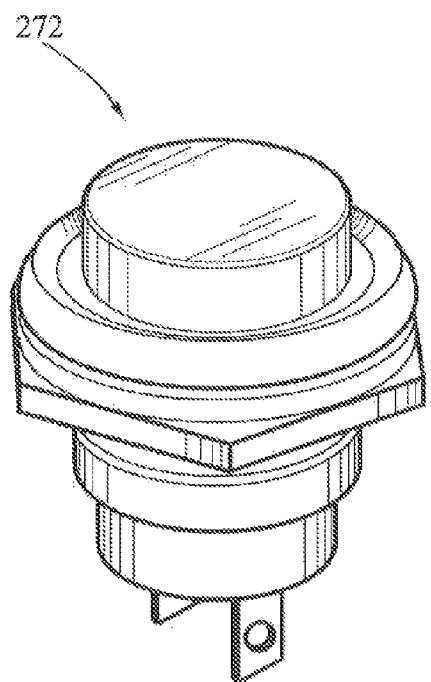
FIG. 22 is a perspective view of an activation switch of the tissue caliper shown in FIG. 18.

With reference now to FIGS. 20-22, switch assembly 270 includes a switch 272 (FIG. 22) disposed on a proximal end of end cap 222 and a control circuit 274 received within base member 232 of caliper assembly 230. As discussed above, the viscoelastic properties of tissue result in different tissue thickness measurements depending on when the measurement is read. Depending on the location of the tissue being measured, it may take a user time to maneuver tissue caliper 200 to a position where display screen 262 (FIG. 19) may be read. During this time, the measured thickness of the tissue will vary. Switch assembly 270 provides tissue caliper 200 with a hold feature that reduces the variability of when measurements are taken, thereby providing more consistent measurements.

Specifically, switch 272 and control circuit 274 are operably connected to display assembly 260. Switch 272 and control circuit 274 are configured such a predetermined time after switch 272 is released, control circuit 274 causes display assembly 260 to hold or lock the displayed measurement. In one embodiment, the length of time between release of switch 272 and locking in of the measurement is between two (2) seconds and five (5) seconds, and more particularly, three (3) seconds. It is envisioned that control circuit 266 may be modified to increase and/or decrease the length of time before the displayed measurement is locked. Such a modification may be required depending on the properties of the tissue being measured. The displayed measurement may then be displayed for a set length of time, i.e., five (5) seconds, or until switch 272 is reactivated. A schematic of the circuitry of switch assembly 270 is shown in FIG. 21.

With reference to FIG. 23, tissue caliper 200 may further include protective cover 280. Protective cover 280 is configured to be received over control circuits 266, 274 of measuring and display assembly 260 and switch assembly 270, respectively. Protective cover 280 provides a watertight seal and permits selective access to control circuits 266, 274.

Figure 24:
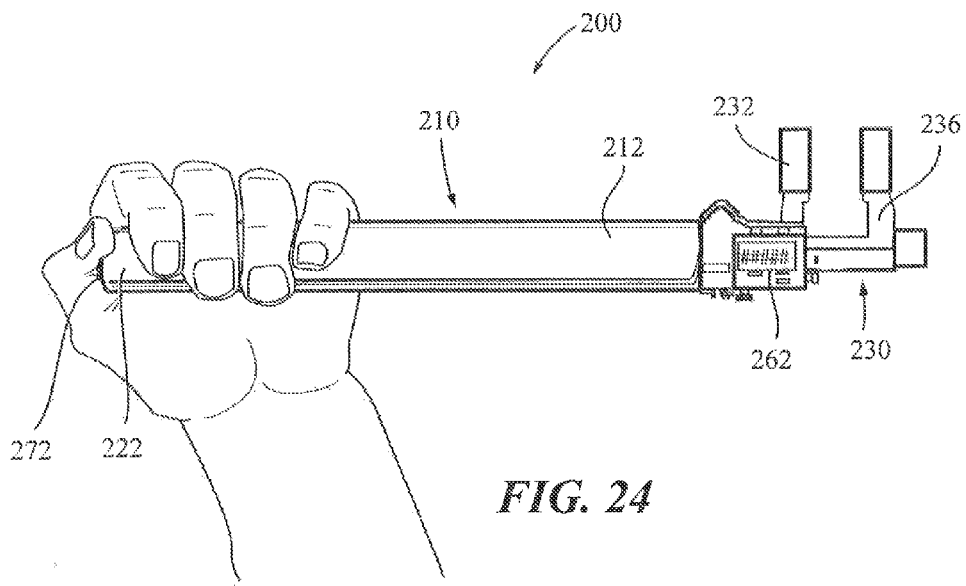
FIG. 24 is a side view of the tissue caliper shown in FIG. 18 during depression of the end by a user.
Figure 25:
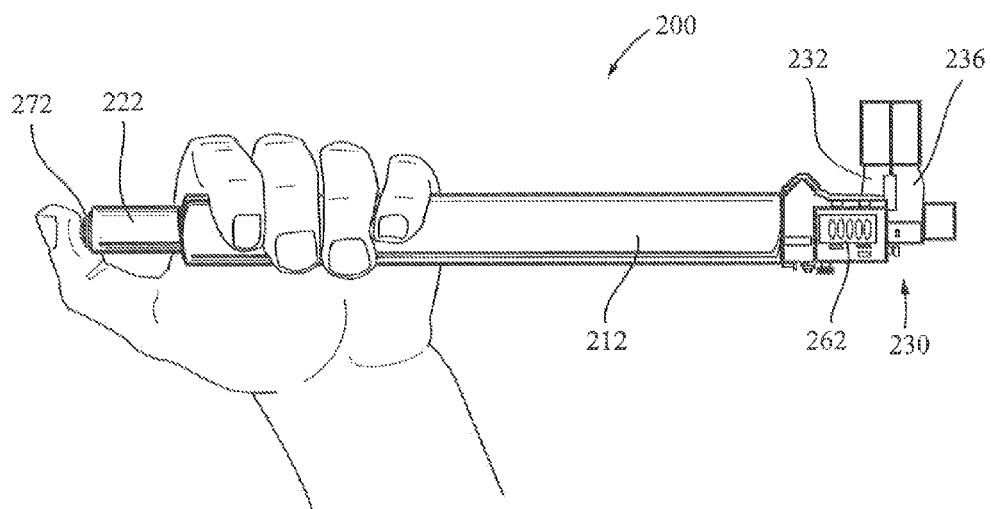
FIG. 25 is a side view of the tissue caliper shown in FIG. 18 upon release of the end cap by a user.

The use of tissue caliper 200 will now be described with reference to FIGS. 24 and 25. In use, and as seen in FIG. 24, tissue caliper 200 is grasped in the hand of a user (right/left) in a manner similar to that of a user when operating a retractable pen. In particular, the fingers of the user are wrapped about a proximal end 212a of tubular body 212 such that the thumb of the user engages switch 272 positioned on end cap 222. Depression of end cap 222 relative to tubular body 212 causes the opening of caliper assembly 230. Tissue (not shown) may then be placed between the jaw portions of base member 232 and sliding member 236. Alternatively, because of its ergonomic design, opened caliper assembly 230 may be positioned, in situ, about the tissue to be measured.

Once the tissue to be measured has been positioned with open caliper assembly 230, the user released his/her thumb from end cap 222 to permit the closing of caliper assembly 230. When releasing end cap 222, the user also release switch 272. As discussed above, a predetermined time after the release of switch 272, switch assembly 270 is configured to lock the measurement shown on display screen 262.

As discussed above, by locking the displayed measurement at a predetermined time during each use of tissue caliper 200 a more consistent reading is provided between uses and with different users. As also discussed above, the use of a magnetic spring in the tissue calipers of the present disclosure improves the consistency of measurements between tissues of varying thickness. The ergonomic and user friendly design of the presently disclosed tissue calipers increases the reliability of the measurements and provides for more consistent results.

Although the illustrative embodiments of the present disclosure have been described herein with reference to the accompanying drawings, it is to be understood that the disclosure is not limited to those precise embodiments, and that various other changes and modifications may be effected therein by one skilled in the art without departing from the scope or spirit of the disclosure.

What is claimed is:
1. A tissue caliper comprising:
a housing assembly including a tubular body, the tubular body having proximal and distal ends;
an activation assembly operably disposed within the tubular body, the activation assembly including a magnetic spring and an end cap disposed on a proximal end of the magnetic spring for activating the magnetic spring; and
a caliper assembly disposed on the distal end of the tubular body, the caliper assembly being operably connected to the activation assembly, wherein activation of the magnetic spring effects opening and closing of the caliper assembly.

2. The tissue caliper of claim 1, wherein the caliper assembly includes a base member and a sliding member.

3. The tissue caliper of claim 2, wherein each of the base member and the sliding member includes a jaw portion for engaging tissue.

4. The tissue caliper of claim 3, wherein the magnetic spring is operably connected to the sliding member.

5. The tissue caliper of claim 1, further including a display assembly for displaying a measurement of thickness of a material operably engaged by the caliper assembly.

6. The tissue caliper of claim 5, further including a switch assembly for locking the measurement displayed by the display assembly, the switch assembly including a switch and an RC control circuit.

7. The tissue caliper of claim 6, wherein the RC control circuit is configured to lock the displayed measurement a predetermined time after the release of the switch.

8. The tissue caliper of claim 7, wherein the predetermined time is between two (2) seconds and five (5) seconds.

9. The tissue caliper of claim 8, wherein the predetermined time is three (3) seconds.

10. The tissue caliper of claim 1, wherein depression of the end cap relative to the tubular body causes opening of the caliper assembly.

11. The tissue caliper of claim 1, further including a removable cover for protecting internal circuitry.

12. The tissue caliper of claim 1, further including a measuring and display assembly.

13. The tissue caliper of claim 12, wherein the measuring and display assembly is configured to store multiple measurements.

14. The tissue caliper of claim 12, wherein the measuring and display assembly includes a recall feature for reviewing previous measurements.

15. The tissue caliper of claim 12, wherein the measuring and display assembly is configured to process multiple measurements and provide an average measurement.

16. A kit comprising:
   a tissue caliper including a magnetic spring for effecting opening and closing of a caliper assembly, the caliper assembly including first and second jaw portions;
   a first set of jaw attachments selectively engagable with the first and second jaw portions, the first set of jaw attachments having a first tissue contact surface defining a first surface area; and
   at least a second set of jaw attachments selectively engagable with the first and second jaw portions, the first set of jaw attachments having a second tissue contacting surface defining a second surface area different from the first surface area.

17. The tissue caliper of claim 1, wherein the activation assembly includes a switch, the switch being positioned for engagement by a thumb of a user while the user grasps the tubular body.

18. A tissue caliper comprising:
   a housing assembly;
   an activation assembly operably received within the housing assembly;
   a caliper assembly operably connected to the activation assembly, wherein the activation assembly includes a magnetic spring for effecting the opening and closing of the caliper assembly;
   a display assembly for displaying a measurement of thickness of a material operably engaged by the caliper assembly; and
   a switch assembly for locking the measurement displayed by the display assembly, the switch assembly including a switch and an RC control circuit, wherein the RC control circuit is configured to lock the displayed measurement between two (2) seconds and five (5) seconds after the release of the switch.

19. A tissue caliper comprising:
   a housing assembly including a tubular body, the tubular body having proximal and distal ends;
   an activation assembly operably disposed within the tubular body, the activation assembly including a magnetic spring and an end cap disposed on a proximal end of the magnetic spring for activating the magnetic spring;
   a caliper assembly disposed on the distal end of the tubular body, the caliper assembly operably connected to the activation assembly, wherein activation of the magnetic spring effects opening and closing of the caliper assembly; and
   a display assembly for displaying a measurement of thickness of a material operably engaged by the caliper assembly, the display assembly coupled to an RC control circuit configured to lock the displayed measurement for between two (2) seconds and five (5) seconds.

* * * * *